(12) United States Patent
Lee et al.

(10) Patent No.: US 10,974,568 B2
(45) Date of Patent: Apr. 13, 2021

(54) COOLANT HEATING APPARATUS FOR VEHICLE

(71) Applicants: HYUNDAI MOTOR COMPANY, Seoul (KR); KIA MOTORS CORPORATION, Seoul (KR); DOOWON CLIMATE CONTROL CO., LTD., Asan-si (KR)

(72) Inventors: Sang Shin Lee, Suwon-si (KR); Jae Woong Kim, Hwaseong-si (KR); So Yoon Park, Suwon-si (KR); Man Ju Oh, Yongin-si (KR); Du Youl Choi, Asan-si (KR)

(73) Assignees: Hyundai Motor Company, Seoul (KR); Kia Motors Corporation Doowon, Seoul (KR); Climate Control Co., Ltd., Asan-si (KR)

(*) Notice: Subject to any disclaimer, the term of this patent is extended or adjusted under 35 U.S.C. 154(b) by 258 days.

(21) Appl. No.: 15/944,255

(22) Filed: Apr. 3, 2018

(65) Prior Publication Data

US 2019/0176575 A1  Jun. 13, 2019

(30) Foreign Application Priority Data

Dec. 8, 2017 (KR) .................. 10-2017-0168708

(51) Int. Cl.
*B60H 1/22* (2006.01)
*B60H 1/00* (2006.01)
*F24H 1/00* (2006.01)

(52) U.S. Cl.
CPC ....... *B60H 1/2221* (2013.01); *B60H 1/00328* (2013.01); *F24H 1/009* (2013.01)

(58) Field of Classification Search
CPC .............. B60H 1/2221; B60H 1/00328; B60H 2001/2259; B60H 2001/2271; B60L 1/02; F24H 9/1818; F24H 9/2028; F01P 7/16; F01P 2070/04; G05D 23/1921; H01M 8/04268; H05B 3/42; H05B 3/82; H05B 2203/021

(Continued)

(56) References Cited

U.S. PATENT DOCUMENTS 6,820,502 B2    11/2004  Jiang et al.
7,760,993 B2 *   7/2010  You .................. D06F 39/008
                                            392/324

(Continued)

*Primary Examiner* — Ibrahime A Abraham
*Assistant Examiner* — William C. Gibson
(74) *Attorney, Agent, or Firm* — Morgan, Lewis & Bockius LLP

(57) ABSTRACT

A coolant heating apparatus includes: a housing having a coolant flow path therein and configured to cause coolant to flow into the housing and to flow out from the housing after being heated; a sheath heater provided in an inside of the housing and configured to heat the coolant; and a heat conduction plate provided inside the housing and made of a heat-conductive material. A portion of the heat conduction plate is bent in a shape to enclose an outer circumferential surface of the sheath heater and to be in surface contact with the sheath heater so as to carry out heat conduction with the sheath heater, and a remaining portion of the heat conduction plate is in surface contact with the coolant inside the housing such that the coolant is heated by heat conducted from the sheath heater.

16 Claims, 11 Drawing Sheets

(58) Field of Classification Search
USPC .................................................. 392/465–496
See application file for complete search history.

(56) References Cited

U.S. PATENT DOCUMENTS

| | | | |
|---|---|---|---|
| 8,948,582 B2* | 2/2015 | Kominami | F24H 9/20 165/175 |
| 2007/0257023 A1* | 11/2007 | Watanabe | H01L 21/67103 219/444.1 |
| 2008/0230535 A1* | 9/2008 | Huang | H01L 21/67103 219/444.1 |
| 2009/0085713 A1* | 4/2009 | Tsang | F24C 7/105 338/23 |
| 2011/0088849 A1* | 4/2011 | Kishimoto | C23C 16/5096 156/345.44 |
| 2012/0295141 A1* | 11/2012 | Allen | H01M 10/615 429/62 |
| 2014/0096716 A1* | 4/2014 | Chung | C23C 16/4586 118/725 |
| 2014/0123731 A1* | 5/2014 | Basu | G01N 27/221 73/38 |

* cited by examiner

COOLANT HEATING APPARATUS FOR VEHICLE

CROSS REFERENCE TO RELATED APPLICATION

The present disclosure is based on and claims the benefit of priority to Korean Patent Application No. 10-2017-0168708, filed on Dec. 8, 2017, with the Korean Intellectual Property Office, the entire contents of which are incorporated herein for all purposes by this reference.

TECHNICAL FIELD

The present disclosure relates to a sheath heater for heating coolant of a vehicle, and more particularly, to a coolant heating apparatus for a vehicle for preventing a reduction of heat transfer quantity as a heat generation portion of the sheath heater is exposed to air instead of the coolant.

BACKGROUND

Recently, electric vehicles have been emerging as a social issue to solve problems, such as the implementation of environmentally friendly technologies and energy depletion. The electric vehicles have drawn attention as environmentally friendly vehicles due to advantages in that the electric vehicles do not emit carbon dioxide and are very quiet since the electric vehicles operate using a motor that receives electricity from a battery and output power, and in that the energy efficiency of the motor is higher than that of an engine.

However, unlike a conventional internal combustion engine vehicle in which coolant is heated using a heat source generated by an engine, the electric vehicles have a disadvantage in that it is impossible to heat coolant using heat generated from the engine since the electric vehicles are not separately equipped with an engine.

Therefore, it is necessary to separately provide an apparatus for heating the coolant. However, when air is generated within a coolant housing provided with a sheath heater, a heat generation portion of the sheath heater is exposed to the air instead of the coolant, and as a result, heat transfer quantity is decreased and furthermore, temperature of the heat generation portion is increased, which may cause a failure of the sheath heater.

It should be understood that the foregoing description of the background art is provided merely for the purpose of promoting the understanding of the background of the present disclosure, but is not intended to acknowledge that the present disclosure corresponds to the prior art that has already been known to those skilled in the art.

SUMMARY

The present disclosure solves the problems described above, and provides a coolant heating apparatus for a vehicle, which is capable of increasing heating efficiency of coolant, preventing components from being damaged by overheating, and of improving degree of design freedom.

In accordance with an aspect of the present disclosure, a coolant heating apparatus for a vehicle may include: a housing having a coolant flow path therein and configured to cause coolant to flow into the housing and to flow out from the housing after being heated; a sheath heater provided in an inside of the housing and configured to heat the coolant; and a heat conduction plate provided inside the housing and made of a heat-conductive material. A portion of the heat conduction plate is bent in a shape that encloses an outer circumferential surface of the sheath heater and is in surface contact with the sheath heater so as to carry out heat conduction with the sheath heater, and a remaining portion of the heat conduction plate is in surface contact with the coolant inside the housing so as to use the heat conducted from the sheath heater to raise a temperature of the coolant.

The sheath heater may be disposed on the heat conduction plate, and the coolant flow path may be divided into a first flow path and a second flow path based on the sheath heater. The first flow path may be connected to an inlet port through which the coolant flows into the housing and the second flow path may be connected with an outlet port through which the coolant flows out of the housing. The coolant may flow into the housing through the inlet port, may be heated by the sheath heater while passing through the first flow path and the second flow path, and may then flow out from the housing through the outlet port.

The sheath heater disposed on the heat conduction plate may be bent at least once to form a closed curve including an edge of the heat conduction plate, and the coolant flow path may be divided into a first flow path and a second flow path with respect to the sheath heater. The first flow path may have a shorter coolant flow path than the second flow path, and the coolant moving in the first flow path may have a relatively low temperature compared to the coolant moving in the second flow path.

A Printed Circuit Board (PCB) may be located outside the first flow path, so that the PCB may be cooled by coolant having a relatively low temperature.

The sheath heater may be provided with an anode terminal and a cathode terminal, each being electrically connected to an outside via an electric circuit, and the anode terminal and the cathode terminal may extend in the same direction to be exposed to the outside of the housing.

The housing may be provided with an inlet port through which the coolant flows into the housing and an outlet port through which the coolant flows out of the housing. The inlet port may be disposed closer to the cathode and anode terminals of the sheath heater than the outlet port, and a PCB may be located between the cathode terminal and the anode terminal, so that the PCB may be cooled by the coolant having a relatively low temperature.

The heat conduction plate may have a seating groove curved in the shape of the sheath heater, and the sheath heater may be disposed in the seating groove, so that the sheath heater and the heat conduction plate may be in surface contact with each other in a direction in which the sheath heater extends.

The depth of the seating groove is set to be within ½ of the diameter of the sheath heater.

The sheath heater may have at least two heat conduction plates, which are provided on opposing sides of the sheath heater, and an outer circumferential surface of the sheath heater may be in close contact with and enclosed by the seating groove in each of the at least two heat conduction plates, so that the sheath heater may not be in direct contact with the coolant.

The sheath heater may be bent and may have a symmetrical shape with respect to a bent point in a middle portion of the heat conduction plate, and the sheath heater has at least two heat conduction plates coupled to opposing sides of the sheath heater, which are symmetric each other with respect to the sheath heater, such that the at least two heat conduction plates have a single shape.

The sheath heater may have at least two heat conduction plates, which may be provided on opposing sides thereof. A first heat conduction plate of the at least two heat conduction plates may be provided on one side of the sheath heater and may have a seating groove, which is curved along a shape of the sheath heater, so that the sheath heater is disposed in the seating groove. A second heat conduction plate of the at least two heat conduction plates may be provided on a remaining side of the sheath heater may be in a flat shape, so that the sheath heater and the second heat conduction plate are in line contact with each other.

Each of the heat conduction plates may be provided with one or more communication holes such that the coolant flows into or out of the communication holes. The one or more communication holes may include at least one first communication hole through which the coolant having a relatively low temperature moves and at least one second communication hole through which the coolant having a relatively high temperature moves. The coolant may flow into the housing through an inlet port of the housing, may then sequentially pass through the at least one first communication hole and the at least one second communication hole to be heated, and then flow out to an outside of the housing through an outlet port.

A first flow path, which is formed by the coolant having the relatively low temperature and moving through the at least one first communication hole, may have a shorter route in comparison with a second flow path, which is formed by the coolant having the relatively high temperature and moving through the at least one second communication hole.

The sheath heater and one or more heat conduction plates provided thereon form a sheath heater unit and a plurality of sheath heater units may be stacked, such that the coolant may flow into the plurality of the sheath heater units through the inlet port, may pass through all of the at least one first communication holes, may then pass through all of the at least one second communication holes, and may then flow out through the outlet port, so that the coolant may move in an extended flow path.

A flat heat conduction plate, in which the at least one first communication hole and the at least one second communication hole are formed, may be provided between the sheath heater units, so that the coolant may move in an extended flow path.

The sheath heater disposed on the heat conduction plate may be bent at least once to form a closed curve including an edge of the heat conduction plate, an inner side and an outer side of the closed curve may be separated from each other by the sheath heater, and the at least one first communication hole and the at least one second communication hole may be located in the inner side and the outer side, respectively.

A first heat conduction plate of one layer may have a first communication hole, which is located in a center of the inner side close to an edge side of the first heat conduction plate. A second heat conduction plate of another layer may have two or more first communication holes, which are respectively located on opposite ends in the inner side of the second heat conduction plate, which is farthest from the first communication hole in the center of the first heat conduction plate and is capable of ensuring a long flow path. A pair of the first and second heat conduction plates may be alternately disposed, such that the coolant flows into the first communication hole located in the center of the first heat conduction plate, may branch into the two or more first communication holes located in the opposite ends of the second heat conduction plate, may join again at the first communication hole located in the center, and may then flow out through the two or more first communication holes of an adjacent pair, and this process may be repeated.

A first heat conduction plate of one layer may have a second communication hole, which is located in a center of the outer side of the first heat conduction plate. A second heat conduction plate of another layer may have two or more second communication holes, which are respectively located on opposite ends of the outer side of the second heat conduction plate, which is farthest from the second communication hole in the center of the first heat conduction plate and is capable of ensuring a long flow path. A pair of the first and second heat conduction plates may be alternately disposed, such that the coolant flows into the second communication hole located in the center, branches into the two or more second communication holes located in the opposite ends, joins again at the second communication hole located in the center and then flows out through the two or more second communication holes of an adjacent pair, and this process is repeated.

Opposite side ends of the heat conduction plate may be bent to have a predetermined length, and may then extend to form side surfaces of the coolant flow path in which the coolant moves, and the sheath heater units may be stacked such that the side surfaces of the heat conduction plate may form side surfaces of the housing.

The coolant heating apparatus may further include: a sensing member provided at a point outside the coolant flow path where two adjacent heat conduction plates meet, the sensing member being configured to sense a temperature of the two adjacent heat conduction plates; and a controller configured to control the sheath heater based on the temperature sensed by the sensing member.

The controller may determine whether or not the coolant is present in the coolant flow path based on a difference between temperatures of respective heat conduction plates, which are sensed by the sensing member, and may perform individual control for each sheath heater located in different layers.

The sheath heater disposed on the heat conduction plate may be bent at least once to form a closed curve including an edge of the heat conduction plate, an inner side and an outer side of the closed curve may be separated from each other by the sheath heater, and a path-switching groove, which is faulted concavely in the bottom surface of the housing in a flow direction of the coolant, may be formed over the inner side, the outer side, and the sheath heater, so that the coolant, which has moved to the bottom surface of the housing, may rise over a boundary of the sheath heater along the path-switching groove.

The sheath heater disposed on the heat conduction plate may be bent at least once, and the heat conduction plate may be provided on each opposing side of the sheath heater, respectively, so as to form a sheath heater unit, and coolant flow paths may be formed on upper and lower sides of the sheath heater unit, respectively.

A plurality of sheath heater units may be provided and stacked within the housing, and among a stacked group of a top surface of the housing, the heat conduction plate on one side of the sheath heater unit, the heat conduction plate on a remaining side of the sheath heater unit, and a bottom surface of the housing, two adjacent structures may be welded to each other at a point between two adjacent sheath heaters so as to form the coolant flow path including the sheath heater therein.

The housing may include, in a same surface, an inlet port into which the coolant flows and an outlet port through which the coolant flows out. The heat conduction plate may include a first communication hole, which is provided adjacent to the inlet port, so that the coolant, flowing into the inlet port and having a relatively low temperature, moves through the first communication hole. The heat conduction plate may include a second communication hole, which is provided adjacent to the outlet port, so that the coolant having a relatively high temperature, moves through the second communication hole. The coolant flowing into the inlet port may branch off to the second communication hole of a same layer and to the first communication hole in a next layer, and then flow out to the outlet port through the second communication hole, thereby constituting the coolant flow paths in parallel.

According to the coolant heating apparatus for a vehicle, which is configured as described above, the heat conduction plates of the present disclosure can be formed of a material such as aluminum that is excellent in thermal conductivity, so that the weight of the coolant heating apparatus can be reduced. In addition, since the coolant heating apparatus can be manufactured by placing a sheathed heater in the seating groove in each of the heat conduction plates and stacking the conduction plates or the sheath heater units and performing brazing on all of them at once, productivity can be improved and the coolant can be prevented from leaking to the outside.

Moreover, by increasing or reducing the number of stacked sheath heater units as required, it is possible to easily cope with the required capacity. By using the heat conduction plates having the same shape repeatedly, it is possible to easily develop the sheath heat units for various types of vehicles without increasing investment costs. Further, since it is possible to configure inner flow paths in various ways, the degree of freedom in design can be enhanced and an appropriate inner flow path resistance can be implemented.

In addition, the seating groove is formed to have a diameter that causes the seating groove to come into close contact with and to enclose the outer surface of the sheath heater, thereby increasing the contact area with the heat conduction plate while fixing the sheath heater. Thereby, it is possible to improve heating efficiency through heat conduction and to suppress the occurrence of a hot spot portion.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, a coolant heating apparatus for a vehicle according to an embodiment of the present disclosure will be described with reference to the accompanying drawings.

Figure 1:
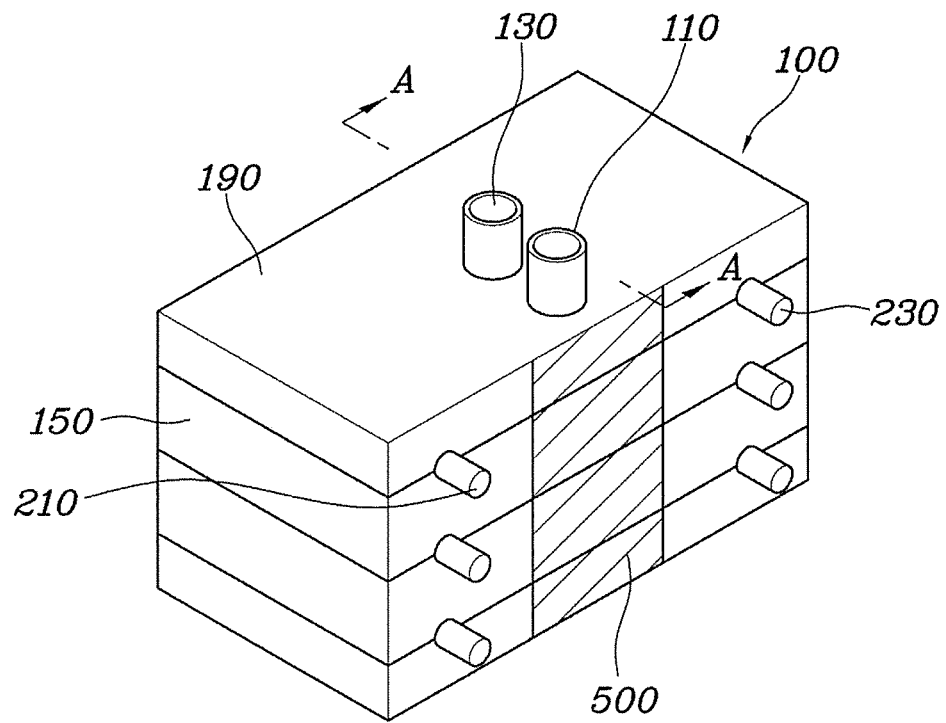
FIG. 1 is a view illustrating a coolant heating apparatus for a vehicle according to an embodiment of the present disclosure.
Figure 2:
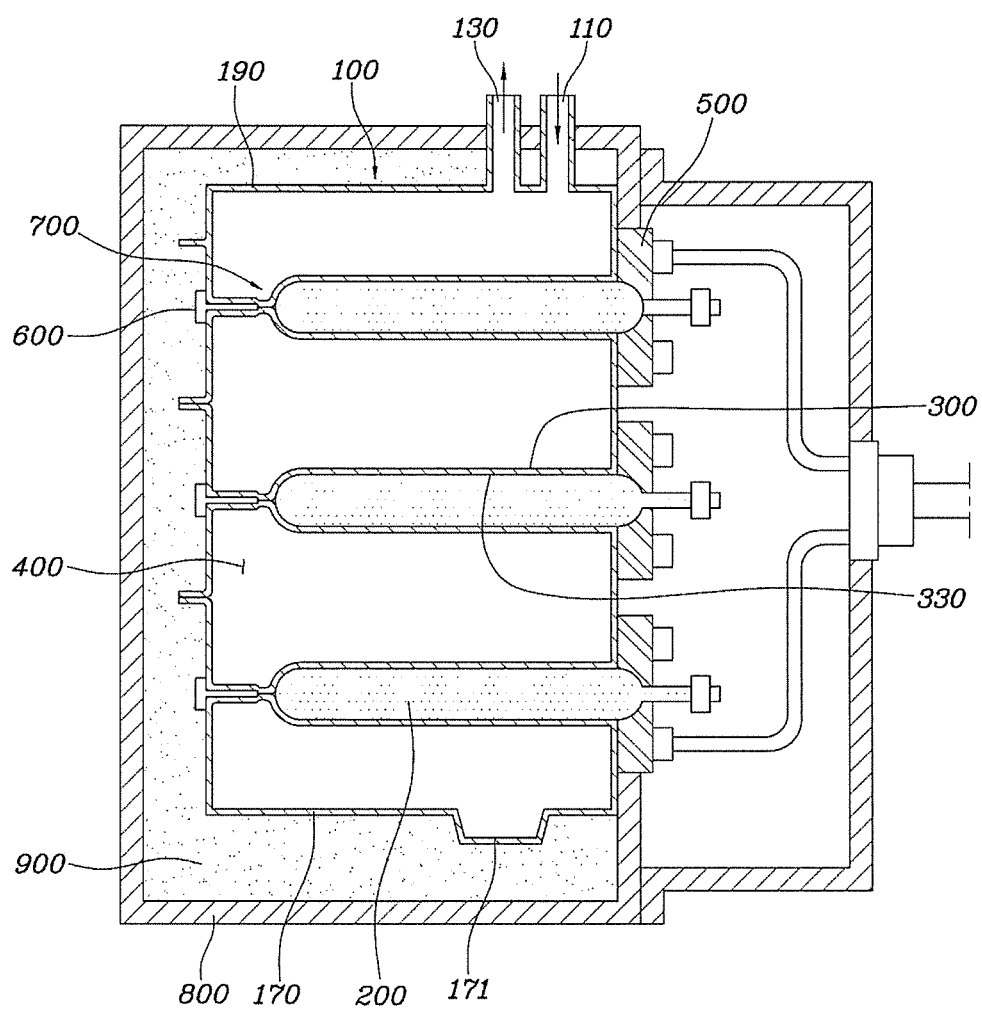
FIG. 2 is a cross-sectional view taken along line A-A in FIG. 2.
Figure 4:
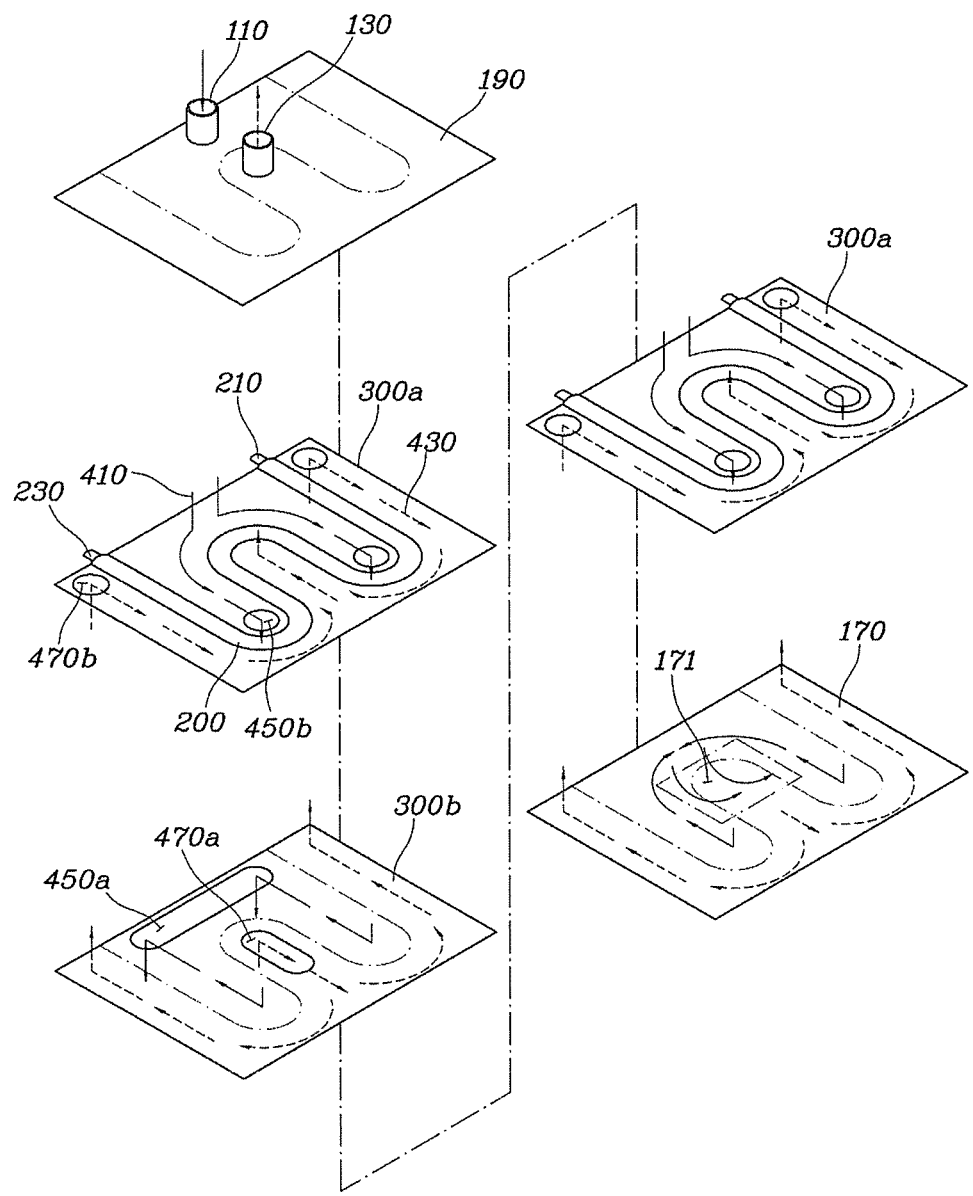
FIG. 4 is an exploded perspective view of FIG. 1.
Figure 5:
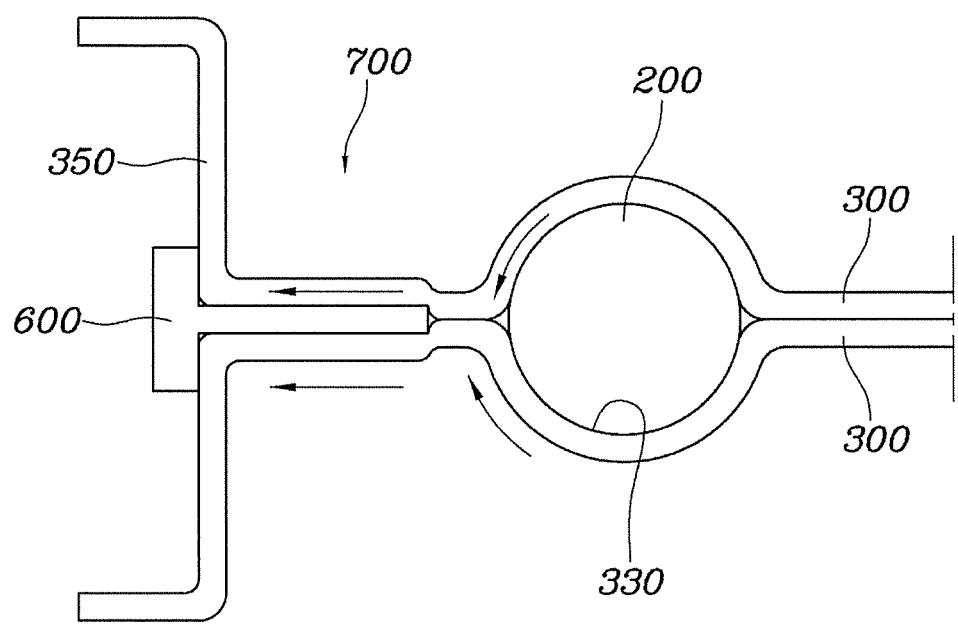
FIG. 5 is a view illustrating a sensing member.
Figure 6:
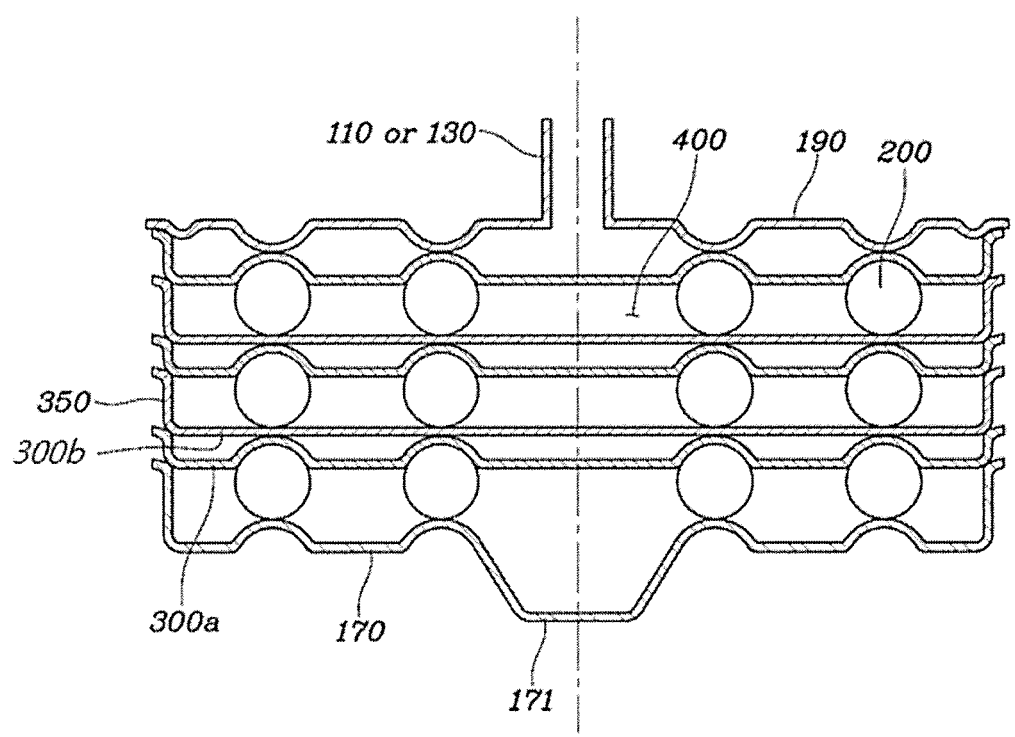
FIG. 6 is a cross-sectional view of a second embodiment of the present disclosure.
Figure 7:
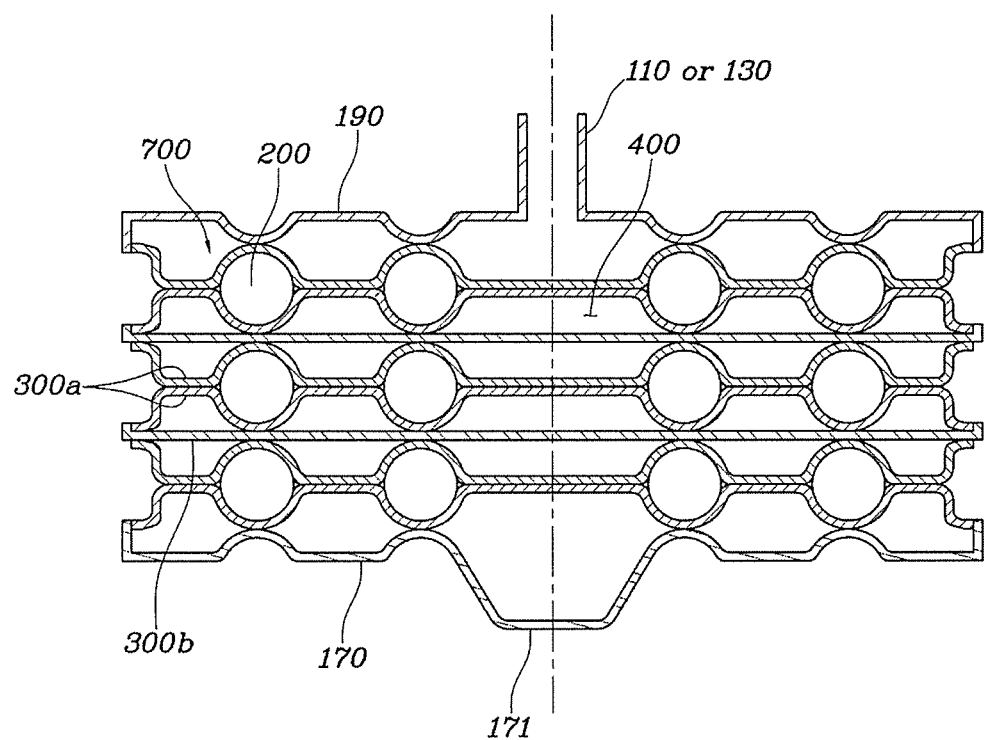
FIG. 7 is a cross-sectional view of a third embodiment of the present disclosure.
Figure 8:
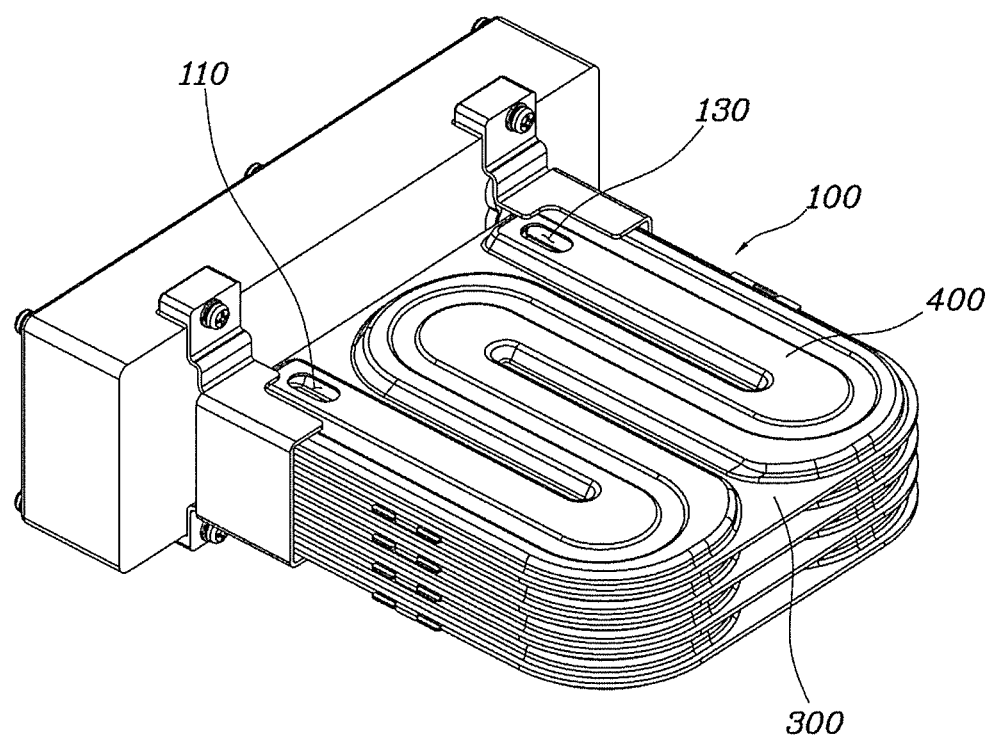
FIGS. 8 and 9 are cross-sectional views of a fourth embodiment of the present disclosure.
Figure 9:
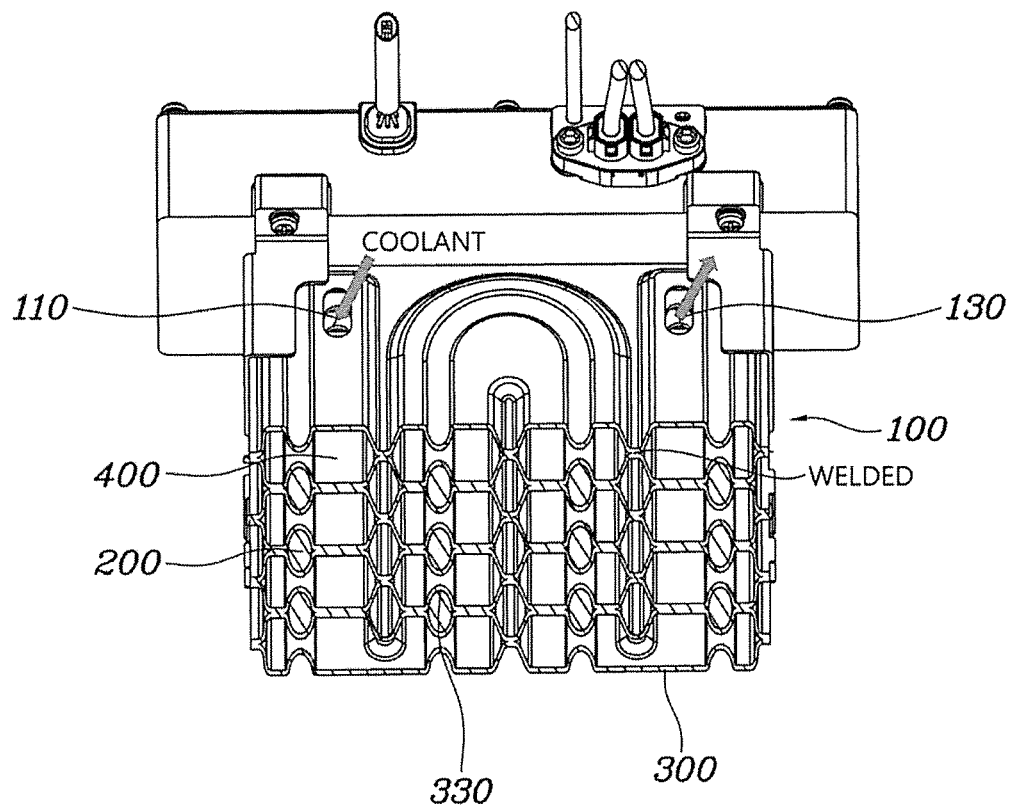
Figure 10:
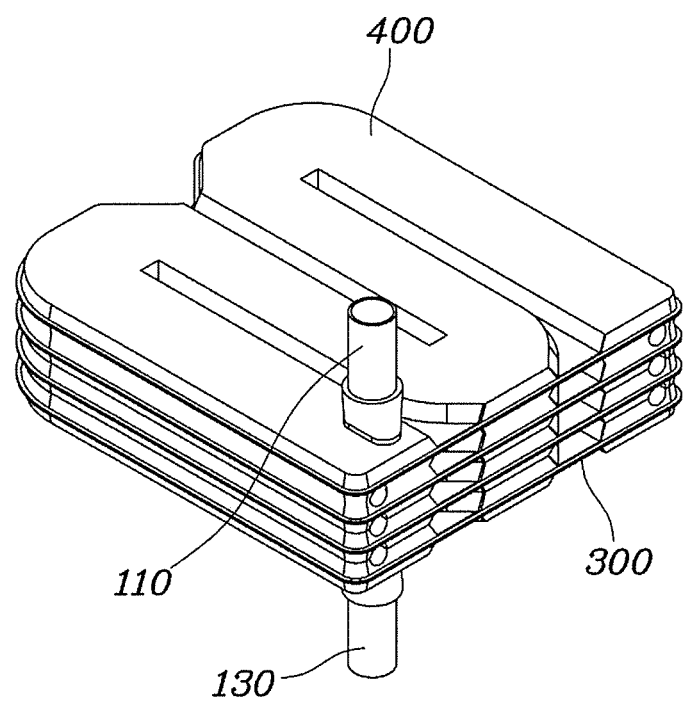
FIG. 10 is a cross-sectional view of a fifth embodiment of the present disclosure.

FIG. 1 is a view illustrating a coolant heating apparatus for a vehicle according to an embodiment of the present disclosure, FIG. 2 is a cross-sectional view taken along line A-A in FIG. 1, and FIGS. 3A to 3D are views illustrating a heat conduction plate 300 of FIG. 1. In addition, FIG. 4 is an exploded perspective view of FIG. 1, and FIG. 5 is a view illustrating a sensing member 600. Further, FIG. 6 is a cross-sectional view of a second embodiment of the present disclosure, FIG. 7 is a cross-sectional view of a third embodiment of the present disclosure, FIGS. 8 and 9 are cross-sectional views of a fourth embodiment of the present disclosure, and FIG. 10 is a cross-sectional view of a fifth embodiment of the present disclosure.

According to an embodiment of the present disclosure, a coolant heating apparatus for a vehicle includes: a housing 100 having a coolant flow path 400 into which coolant flows and from which the coolant is discharged after being heated; a sheath heater 200 provided inside the housing 100 and configured to heat the coolant; and a heat conduction plate 300 provided inside the housing 100 and made of a heat-conductive material. A portion of the heat conduction plate 300 is bent in a shape that encloses the outer circumferential surface of the sheath heater 200 and is in surface contact with the sheath heater 200 so as to carry out heat conduction with the sheath heater 200, and a remaining portion of the heat conduction plate 300 is in surface contact with the coolant inside the housing so as to use the heat conducted from the sheath heater 200 to raise a temperature of the coolant.

The concept of the present disclosure is as follows: the coolant heating apparatus for a vehicle includes the coolant flow path 400 formed to allow coolant move therein, the heat conduction plate 300 to be in contact with the sheath heater 200 is provided in the coolant flow path 400 so as to allow coolant, which flows into the housing 100, to be heated by the heat conduction plate 300 and to be discharged again to the outside of the housing 100. It is evident that the temperature of the coolant flowing into the housing 100 and the coolant is lower than the temperature of the coolant flowing out of the housing 100. This will be described in more detail with reference to the drawings.

As illustrated in FIGS. 1 and 2, the housing 100 is provided with a heat conduction plate 300 and a sheath heater 200 therein. The coolant flows into the housing 100 through an inlet port 110, heated by the heat conduction plate 300, and then flows out of the housing 100 through an outlet port 130. The inlet port 110 and the outlet port 130 may be located on a top surface 190 of the housing 100. Relatively cold water has the property of moving down and relatively hot water has the property of moving up, and these features are reflected in the feature mentioned just above. However, the positions of the inlet port 110 and the outlet port 130 are not necessarily limited to such positions. In another embodiment, the housing may be designed by changing the positions of the inlet port 110 and the outlet port 130. When the inlet port 110 and the outlet port 130 are disposed in the top surface 190 of the housing 100, the inlet port 110 is disposed closer to the side of the terminals 210 and 230 of the sheath heater 200 than the outlet port 130, as illustrated in FIGS. 1 and 2. In addition, a path-switching groove 171 is formed in the bottom surface 170 of the housing 100 to be recessed downward so as to change the flow direction of the coolant, which will be described later.

A cover 800 may be provided outside the housing 100 so as to enclose the housing 100 and the terminals of the sheath heater 200. Between the housing 100 and the cover 800, a heat insulating material 900 may be provided in order to prevent the coolant from radiating heat through the housing 100 while flowing.

The sheath heater 200 is provided inside the housing 100 and heats the coolant flowing into the housing 100. Each sheath heater 200 has a bar shape and is bent at least once. The sheath heater 200 is provided with an anode terminal 210 and a cathode terminal 230, which are electrically connected to the outside through an electric circuit. When current is applied under the control of a controller 500, heat is generated to raise the temperature of the coolant. In particular, the anode terminal 210 and the cathode terminal 230 extend toward the same direction of the sheath heater 200 and are exposed to the outside of the housing 100, so that the anode terminal 210 and the cathode terminal 230 are not in direct contact with the coolant so that electric stability can be improved. A PCB substrate 500, which is the controller 500 for controlling the sheath heater 200, is disposed between the anode terminal 210 and the cathode terminal 230 of the sheath heater 200. Accordingly, the PCB substrate 500 is configured to be cooled by heat exchange with coolant flowing therein through the inlet port 110 and having a relatively low temperature. That is, the relatively cold coolant flowing therein through the inlet port 110 is heated by heat exchange with the PCB substrate 500, and the PCB substrate 500 discards the heat generated therefrom into the coolant, so that the PCB substrate 500 can be operated stably and the coolant can be rapidly heated.

The heat conduction plate 300 is made of a thermally conductive material and is disposed at a position adjacent to the sheath heater 200 inside the housing 100. A portion of the heat conduction plate 300 is partly bent to surround the outer circumferential surface of the sheath heater 200 and is in surface contact with the sheath heater 200 so as to carry out heat conduction with the sheath heater 200, and the remaining portion of the heat conduction plate 300 comes into surface contact with the coolant within the housing 100, so that the heat conducted from the sheath heater 200 raises the temperature of the coolant.

Figure 3A:
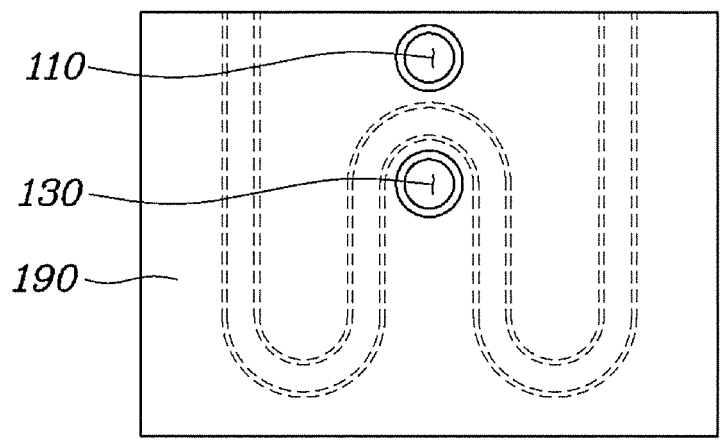
FIGS. 3A to 3D are views illustrating a heat conduction plate of FIG. 1.
Figure 3B:
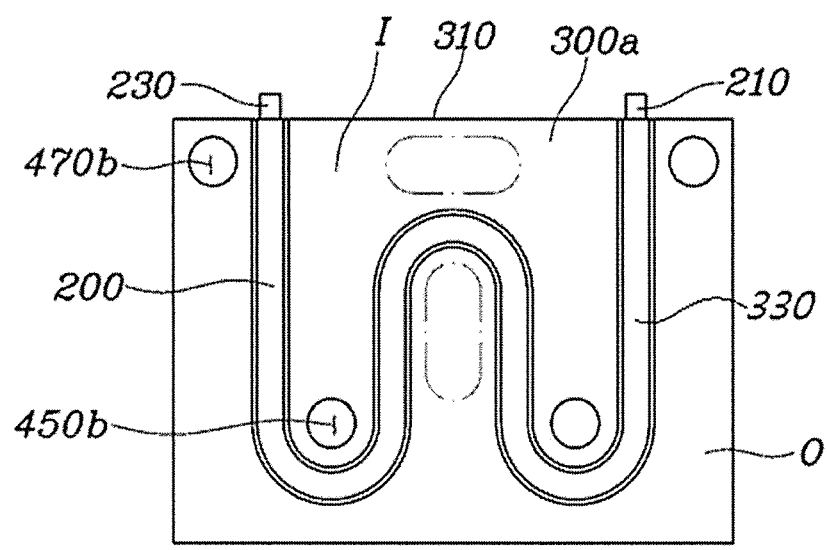
Figure 3C:
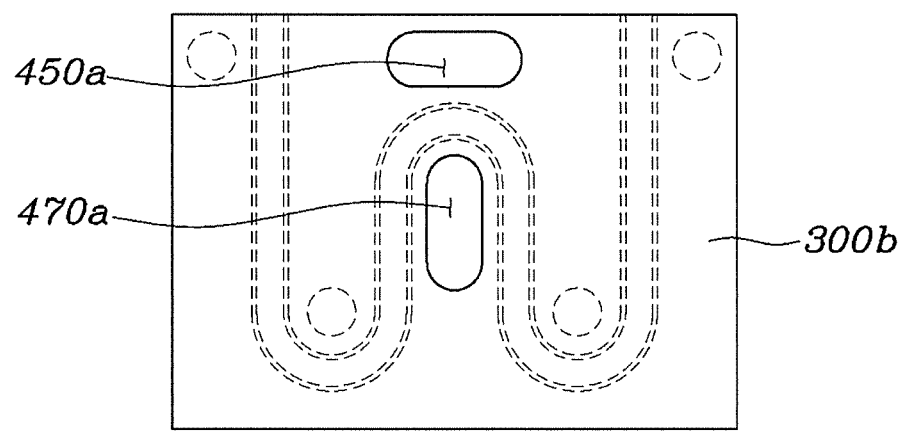
Figure 3D:
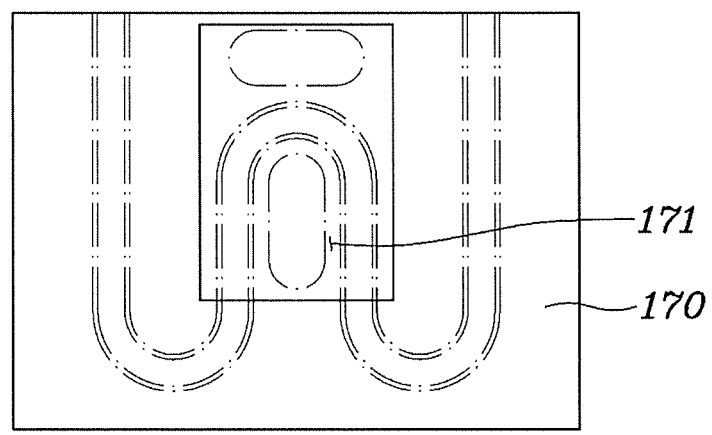

FIGS. 3A to 3D illustrate heat conduction plates 300 having various shapes applied to the present disclosure. FIG. 3A illustrates a heat conduction plate 300 corresponding to the top surface 190 of the housing 100 of the present disclosure. FIG. 3B illustrates a first heat conduction plate 300a in which a seating groove 330 grooved along the shape of the sheath heater 200 and communication holes 450b and 470b are formed. FIG. 3C illustrates a second heat conduction plate 300b which is in a flat shape and has the communication holes 450a and 470a corresponding to the communication holes 450b and 470b, respectively. FIG. 3D illustrates a heat conduction plate corresponding to the bottom surface 170 of the housing 100.

As illustrated in FIG. 3A, an inlet port 110 through which coolant flows into the housing 100 and an outlet port 130 through which coolant flows out of the housing 100 are formed in the top surface 190 of the housing 100.

In the first heat conduction plate 300a illustrated in FIG. 3B, a seating groove 330 grooved along the shape of the sheath heater 200 is formed and the sheath heater 200 is seated in the seating groove 330 such that the sheath heater 200 and the first heat conduction plate 300a are in surface contact with each other along the direction in which the first heat conduction plate 300a extends. The seating groove 330 may be formed to have a depth which is set to be within ½ of the diameter of the sheath heater 200. Therefore, when the first heat conduction plate 300a is provided on each of the opposite sides of the sheath heater 200 with the seating groove 330 having a depth, which is set to be within ½ of the diameter of the sheath heater 200, the circumference of the sheath heater 200 is tightly enclosed by the seating groove 330 of each of the first heat conduction plate 300a. Thus, the sheath heater 200 does not come into direct contact with the coolant, and thus problems such as a short-circuit and disconnection, which may electrically occur, can be eliminated, so that the coolant can be heated more stably.

In particular, the sheath heater 200 is formed in a symmetrical shape with respect to a bent point. Also, the first heat conduction plate 300a coupled to the sheath heater 200 is formed in a symmetrical shape with respect to a bent point of the symmetrical sheath heater 200. Therefore, since the first heat conduction plates 300a having one shape can be respectively coupled to the opposite sides of the first heat conduction plates 300a, it is possible to reduce manufacturing steps, to facilitate production, and to reduce a material cost.

In this specification, the sheath heater 200 is illustrated and described as being bent, for example, twice. However, the number of times of bending and the shape of the sheath heater 200 can be changed depending on a design and environment. Accordingly, the seating groove 330 in the first heat conduction plate 300a is also formed to be curved twice according to the shape of the sheath heater 200. The sheath heater 200 forms a closed curve including an edge 310 of the first heat conduction plate 300a such that an inner side I and an outer side O are divided with respect to the sheath heater 200, as illustrated in FIG. 3B. A first flow path 410 is failed on the inner side I and a second flow path 430 is formed on the outer side O. Here, the first flow path 410 is connected to the inlet port 110 through which the coolant flows into the housing 100 and the second flow path 430 is connected to the outlet port 130 through which the coolant flows out of the housing 100 such that a coolant flow path 400 is formed to continuously extend from the inlet port 110 to the outlet port 130 as a single flow path. Particularly, since the inner side I and the outer side O form spaces, which are independent from each other by the sheath heater 200, the first flow path 410 and the second flow path 430 are completely separated from each other, so that the coolant of the first flow path 410 and the coolant of the second flow path 430 are not mixed with each other.

In addition, the heat conduction plate 300 may have communication holes through which the coolant enters and exits, and a plurality of communication holes may be formed in each heat conduction plate 300. The plurality of communication holes 450 and 470 include first communication holes 450a, 450b through which coolant having a relatively low temperature moves, where the first communication holes 450a, 450b are included in the first flow path 410. The plurality of communication holes 450 and 470 include second communication holes 470a, 470b through which coolant having a relatively high temperature moves, where the second communication holes 470a, 470b are included in the second flow path 430. Therefore, a single coolant flow path 400 is formed from the inlet port 110 to the outlet port 130 through the first communication holes 450a, 450b, the first flow path 410, the second communication hole 470a, 470b, and the second flow path 430.

As one aspect of the present disclosure, a plurality of heat conduction plates 300 may be stacked. In this case, the coolant flows through the inlet port 110 into the housing 100, then sequentially passes through all of the first communication holes 450a, 450b, then sequentially passes through all of the second communication holes 470a, 470b to be heated, and then flows to the outside of the housing 100 through the outlet port 130, thereby forming a single coolant flow path 400. Particularly, the first flow path 410, which includes the first communication holes 450a, 450b formed to allow coolant to move in the inner side I of the sheath heater 200, is formed to have a short moving route therein in comparison with the second flow path 430, which includes the second communication holes 470a, 470b formed to allow coolant to move in the outer side O of the sheath heater 200. Accordingly, while flowing into the housing 100 through the relatively short first flow path 410 and then moving along a relatively long second flow path 430, the coolant having a relatively low temperature is in surface contact with the heat conduction plate 300, to which heat is conducted by the sheath heater 200, so that the temperature of the coolant is raised, and then the coolant flows to the outside of the housing 100 through the outlet port 130.

In the second heat conduction plate 300b illustrated in FIG. 3C, the first communication hole 450a is located in the center of the inner side I which is close to the edge 310 side of the heat conduction plate 300, and the second communication hole 470a is located in the center of the outer side O. In the first heat conduction plate 300a illustrated in FIG. 3B, the first communication holes 450b are respectively located on the opposite sides of the first heat conduction plate 300a, which is farthest from the first communication hole 450a at the center of the second heat conduction plate 300b and is capable of ensuring a long flow path, and the second communication holes 470b are located on the opposite sides of the heat second conduction plate 300b, which is farthest from the second communication hole 470a at the center of the second heat conduction plate 300b and is capable of ensuring a long flow path.

FIG. 3D illustrates a heat conduction plate 300 corresponding to the bottom surface 170 of the housing 100. A path-switching groove 171, which is formed to be concave in the flow direction of the coolant, is provided on the bottom surface 170 of the housing 100 over the inner side I, the outer side O, and the sheath heater 200. Thus, the coolant, which has moved to the bottom surface 170 of the housing 100, rises over the boundary of the sheath heater 200 along the shape of the path-switching groove 171, so that the path of the coolant is changed and the coolant flows out of the housing 100.

That is, in the coolant heating apparatus for a vehicle according to the present disclosure, the heat conduction plate having the shape illustrated in FIG. 3A is disposed on the top surface 190, and the heat conduction plate having the shape illustrated in FIG. 3D is disposed on the bottom surface 170. In the middle of the coolant heating apparatus for a vehicle, only the first heat conduction plate 300a having the shape illustrated in FIG. 3B may be disposed, or the first heat conduction plate 300a having the shape illustrated in FIG. 3B and the second heat conduction plate 300b having the shape illustrated in FIG. 3C may be alternately disposed, and then the conduction plate may be disposed on the bottom surface 170.

In the middle side, the second heat conduction plate 300b having communication holes 450a and 470a formed in a center of the inner side I and a center of the outer side O, respectively, and the grooved heat conduction plate 300a having communication holes 450b and 470b formed at opposite ends in the inner side I and opposite ends in the outer side O, respectively, may be alternately disposed on the intermediate side. Accordingly, the coolant flowing into the inlet port 110 flows into the first communication hole 450a located in the center of the second heat conduction plate 300b, and the coolant flowing into the first communication hole 450a is branched and flows out through the first communication holes 450b, which are located on the opposite ends in the inner side I of the first heat conduction plate 300a. Then, the coolant joins at the first communication hole 450a located in the center of the heat conduction plate 300 again, then is branched, and then flows out, and this process is repeated. After the coolant has circulated through the entire first flow path 410 through the first communication holes 450, the path of the coolant is switched in the path-switching groove 171 located on the bottom surface 170. Thereafter, the coolant flows into the second communication hole 470a located in the center of the second heat conduction plate 300b, which forms the second flow path 430, and the coolant flowing in the second communication hole 470a is branched and flows out through the second communication holes 470b, which are located on the opposite ends in the outer side O of the first heat conduction plate 300a. Then, the coolant joins again at the second communication holes 470a located in the center of the second heat conduction plate 300b again, and then flows out. This process is repeated, and then heated coolant flows out to the outside of the housing 100 through the outlet port 130. Of course, the positions and the numbers of the communication holes 450 and 470 formed in each of the heat conduction plates 300 can be freely changed according to embodiments of the present disclosure.

In a second embodiment of the present disclosure, which is shown in FIG. 6, the heat conduction plates 300 are provided on each of the opposite sides of the sheath heater. On one side of the sheath heater 200, the first heat conduction plate 300a illustrated in FIG. 3B is provided, in which a seating groove 330, which is curved according to the shape of the sheath heater 200 such that the sheath heater 200 is disposed therein. However, on the other side of the sheath heater 200, a second heat conduction plate 300b illustrated in FIG. 3C is provided, so that the sheath heater 200 and the second heat conduction plate 300b are in line contact with each other. The sheath heater 200 and the heat conduction plates 300, which are respectively provided on the opposite sides of the sheath heater 200, constitute a sheath heater unit 700, and a plurality of sheath heater units 700 are stacked, thereby implementing the coolant heating apparatus for a vehicle according to the present disclosure. Particularly, the second embodiment has an advantage in that because a portion, in which the sheath heater 200 is in direct contact with the coolant, is formed, a quick-acting property is improved.

In a third embodiment of the present disclosure illustrated in FIG. 7, a first heat conduction plate 300a having a shape illustrated in FIG. 3B is provided on each of the opposite sides of a sheath heater 200, so that the sheath heater 200 and a pair of first heat conduction plates 300a form a sheath heater unit 700, and a plurality of sheath heater units 700 are stacked and a second heat conduction plate 300b is interposed between the sheath heater units 700. Therefore, the third embodiment has a configuration in which the coolant flow path 400 in which the coolant moves is long compared with the other embodiments. Accordingly, the coolant flow path 400 is configured such that the coolant flows into the flow path 400 through the inlet port 110, passes through all of the plurality of first communication holes 450, then passes through all of the plurality of second communication holes 470, and flows out through the outlet port 130. As a result, the length of the flow path in which the coolant move is increased. Therefore, the time during which the coolant is in contact with the heat conduction plate 300, to which heat is transferred from the sheath heater 200, is increased and the efficiency of raising the temperature of the coolant is increased.

Particularly, the opposite end portions of each of the heat conduction plates 300 illustrated in FIGS. 3A to 3D may be bent and then extended to have a predetermined length, thereby forming a side surface 350 of a coolant flow path 400 in which the coolant moves. By stacking sheath heater units 700 each including the heat conduction plate 300, which has the surface bend and extended to form the side surface 350 as described above forms, the side surfaces 350 of the heat conduction plates 300 is able to form the side surfaces 150 of the housing 100 by stacking the sheath heater units 700 each including the heat conduction plate 300, whereby the structure can be simplified and the material cost can be reduced.

In addition, at a point where the heat conduction plates 300 meet, a temperature-sensing member 600 may be provided outside the coolant flow path 400. Therefore, a controller 500 controls the sheath heater 200 based on the temperature of the heat conduction plates 300, which is sensed by the sensing member 600. When a plurality of sheath heater units 700 is stacked, the controller 500 may determine whether or not coolant exists in the coolant flow path 400 based on the differences between the temperatures of respective heat conduction plates 300, which are sensed by the sensing member 600. Therefore, the controller 500 performs the individual control of the sheath heater 200 depending on the presence or absence of the coolant, thereby prevent overheating of the sheath heater 200, so that the coolant can be prevented from being suddenly boiled and a water level sensor may be eliminated.

FIGS. 8 and 9 are a perspective view and a cross-sectional view illustrating a fourth embodiment of the present disclosure in which heat conduction plates 300 are respectively provided on the upper side and the lower side of the sheath heater 200 so that the sheath heater 200 is enclosed by the heat conduction plates 300 and a coolant flow path 400 is formed therein, and a plurality of sheath heater units 700, each of which is formed thereby, is stacked. In the fourth embodiment, an inlet port 110 is formed at one side of the coolant flow passage 400, an outlet port 130 is formed at the other side of the coolant flow passage 400, so that the coolant flowing into the inlet port 110 moves in the coolant flow paths 400 of the sheath heater units 700, which are arranged parallel to each other, and flows out through the outlet port 130.

More specifically, the sheath heater 200 is bent at least once and is seated on a heat conduction plate 300, and the heat conduction plate 300 is provided on each of the opposite sides of the sheath heater 200, thereby forming a sheath heater unit 700, and a coolant flow passage 400 in which the coolant moves is formed on each of the upper side and the lower side of the sheath heater unit 700. Here, a plurality of sheath heater units 700 are stacked in the housing 100. Among the stacked group of the top surface 190 of the housing 100, the heat conduction plate 300 on one side of each of the sheath heater units 700, the heat conduction plate 300 on the other side of each of the sheath heater units 700, and the bottom surface 170 of the housing 100, two adjacent structures are welded to each other at a point between two adjacent sheath heaters 200, so that a coolant flow path 400, which includes the sheath heater 200 therein, is formed.

Particularly, the housing 100 is provided, in the same surface thereof, with an inlet port 110 into which the coolant flows and an outlet port 130 through which the coolant flows out. In the heat conduction plate 300, a first communication hole 450, in which the coolant having a relatively low temperature and introduced through the inlet port 110 flows, is formed at the inlet port 110 side, and a second communication hole 470, in which the coolant having a relatively high temperature flows, is formed at the outlet port 130 side. Thus, the coolant introduced into the inlet port 110 is branched off to the first communication hole 450 in the next layer and to the second communication hole 470 in the same layer and then flows out to the outlet port 130 through the second communication hole 470. Consequently, coolant flow paths 400 are formed parallel to each other. Accordingly, the coolant flowing into the inlet port 110 moves through the first communication hole 450 to the first communication hole 450 and second communication hole 470 in the next layer. Further, the coolant flowing into the first communication hole 450 in the next layer moves to the first communication hole 450 and second communication hole 470 in the next, next layer. During this branching-off process of the coolant layer-by-layer, the coolant is heated by the sheath heater 200, and the coolant is then finally discharged to the outlet port 130.

FIG. 10 is a perspective view of a fifth embodiment of the present disclosure. The sheath heater 200 and the heat conduction plates 300 are formed to have a shape similar to that of those of the fourth embodiment. However, the inlet port 110 is formed in the top surface 190 and the outlet port 130 is configured in the bottom surface 170.

In the coolant heating apparatus for a vehicle according to the present disclosure as described above, in particular the heat conduction plates 300 of the present disclosure can be formed of a material such as aluminum that is excellent in thermal conductivity, so that the weight of the coolant heating apparatus can be reduced. In addition, since the coolant heating apparatus can be manufactured by placing a sheathed heater 200 in a seating groove 330 of each of the heat conduction plates 300 and stacking the heat conduction plates 300 or the sheath heater units 700 and performing brazing on all of them at once, productivity can be improved and the coolant can be prevented from leaking to the outside.

Moreover, by increasing or reducing the number of stacked sheath heater units 700 as required, it is possible to easily cope with the required capacity. By using the heat conduction plates 300 having the same shape repeatedly, it is possible to easily develop the sheath heat units for various types of vehicles without increasing an investment cost. Further, since it is possible to configure inner flow paths in various ways, the degree of freedom in design can be enhanced and an appropriate inner flow path resistance can be implemented.

In addition, the seating groove 330 is formed to have a diameter that causes the seating groove 330 to come into close contact with and to enclose the outer surface of the sheath heater 200, thereby increasing the contact area with the heat conduction plate 300 while fixing the sheath heater 200, thereby improving heating efficiency through heat conduction and suppressing the occurrence of a hot spot portion.

While the present disclosure has been illustrated and explained with respect to specific embodiments thereof, it will be obvious to a person ordinarily skilled in the art that the present disclosure can be variously modified and changed without departing from the scope of the technical idea of the present disclosure, which is defined by the accompanying claims.

What is claimed is:

1. A coolant heating apparatus for a vehicle, comprising:
a housing configured to contain coolant and having a coolant flow path in the housing and configured to cause the coolant to flow into the housing and to flow out from the housing after being heated;
a sheath heater provided in an inside of the housing and configured to heat the coolant; and
a heat conduction plate provided inside the housing and made of a heat-conductive material,
wherein a portion of the heat conduction plate is bent in a shape that encloses an outer circumferential surface of the sheath heater and is in surface contact with the sheath heater so as to carry out heat conduction with the sheath heater,
a remaining portion of the heat conduction plate is in surface contact with the coolant inside the housing such that the coolant is heated by heat conducted from the sheath heater,
wherein the heat conduction plate is provided with one or more communication holes such that the coolant flows into or out of the communication holes,
the one or more communication holes include at least one first communication hole and at least one second communication hole,
the coolant moving through the at least one first communication hole has a temperature lower than a temperature of the coolant moving through the at least one second communication hole,
the coolant flows into the housing through an inlet port of the housing, then sequentially passes through the at least one first communication hole and the at least one second communication hole to be heated, and then flows out to an outside of the housing through an outlet port,
wherein the sheath heater and one or more heat conduction plates provided thereon form a sheath heater unit and a plurality of sheath heater units are stacked, such that the coolant flows into the plurality of the sheath heater units through the inlet port, passes through all of the at least one first communication hole and the at least one second communication hole, and then flows out through the outlet port, so that the coolant moves in an extended flow path,
wherein, in the sheath heater unit, the sheath heater disposed on the heat conduction plate is bent at least once to form a closed curve including an edge of the heat conduction plate,
an inner side and an outer side of the closed curve are separated from each other by the sheath heater,
the at least one first communication hole and the at least one second communication hole are located in the inner side and the outer side, respectively,
wherein a first heat conduction plate of one layer has a first communication hole, which is located in a center of the inner side close to an edge side of the first heat conduction plate,
a second heat conduction plate of another layer has two or more first communication holes, which are respectively located on opposite ends in the inner side of the second heat conduction plate, which is farthest from the first communication hole in the center of the first heat conduction plate and is capable of ensuring a long flow path, and
a pair of the first and second heat conduction plates are alternately disposed, such that the coolant flows into the first communication hole located in the center of the first heat conduction plate, branches into the two or more first communication holes located in the opposite ends of the second heat conduction plate, joins again at the first communication hole located in the center and then flows out through the two or more first communication holes of an adjacent pair, and this process is repeated.

2. The coolant heating apparatus of claim 1, wherein the sheath heater is disposed on the heat conduction plate, and the coolant flow path is divided into a first flow path and a second flow path based on the sheath heater, the first flow path being connected to an inlet port through which the coolant flows into the housing and the second flow path being connected with an outlet port through which the coolant flows out of the housing, and
wherein the coolant flows into the housing through the inlet port, is heated by the sheath heater while passing through the first flow path and the second flow path, and then flows out from the housing through the outlet port.

3. The coolant heating apparatus of claim 1, wherein the sheath heater disposed on the heat conduction plate is bent at least once to form a closed curve including an edge of the heat conduction plate, and
the coolant flow path is divided into a first flow path and a second flow path with respect to the sheath heater, the first flow path having a shorter coolant flow path than the second flow path, and the coolant moving in the first flow path having a temperature lower than a temperature of the coolant moving in the second flow path.

4. The coolant heating apparatus of claim 3, wherein a printed circuit board (PCB) is located outside the first flow path.

5. The coolant heating apparatus of claim 1, wherein the sheath heater is provided with an anode terminal and a cathode terminal, each being electrically connected to an outside via an electric circuit, and
the anode terminal and the cathode terminal extend toward a same direction to be exposed to the outside of the housing.

6. The coolant heating apparatus of claim 5, wherein the housing is provided with an inlet port through which the coolant flows into the housing and an outlet port through which the coolant flows out of the housing,
the inlet port is disposed closer to the cathode and anode terminals of the sheath heater than the outlet port, and
a printed circuit board (PCB) is located between the cathode terminal and the anode terminal.

7. The coolant heating apparatus of claim 1, wherein the sheath heater has at least two heat conduction plates, which are arranged on opposing sides of the sheath heater, respectively, and
wherein each of the at least two heat conduction plates has a seating groove curved in a shape of the sheath heater and the sheath heater is disposed in the seating groove, so that the sheath heater and the heat conduction plate are in surface contact with each other in a direction in which the sheath heater extends.

8. The coolant heating apparatus of claim 7, wherein the seating groove of each of the at least two heat conduction plates has a depth, which is set to be up to ½ of a diameter of the sheath heater.

9. The coolant heating apparatus of claim 7,
wherein an outer circumferential surface of the sheath heater is in close contact with and is enclosed by the seating groove in each of the at least two heat conduction plates, so that the sheath heater is not in direct contact with the coolant.

10. The coolant heating apparatus of claim 7, wherein the sheath heater is bent and has a symmetrical shape with respect to a bent point in a middle portion of the heat conduction plate, and
the sheath heater has at least two heat conduction plates coupled to opposing sides of the sheath heater, which are symmetric each other with respect to the sheath heater, such that the at least two heat conduction plates have a single shape.

11. The coolant heating apparatus of claim 1, wherein the sheath heater has at least two heat conduction plates, which are provided on opposing sides thereof,
a first heat conduction plate of the at least two heat conduction plates is provided on one side of the sheath heater and has a seating groove, which is curved along a shape of the sheath heater, so that the sheath heater is disposed in the seating groove, and
a second heat conduction plate of the at least two heat conduction plates provided on a remaining side of the sheath heater is in a flat shape, so that the sheath heater and the second heat conduction plate are in line contact with each other.

12. The coolant heating apparatus of claim 1, wherein a first flow path, which is formed by the coolant moving through the at least one first communication hole, has a shorter route in comparison with a second flow path, which is formed by the coolant moving through the at least one second communication hole.

13. The coolant heating apparatus of claim 1, wherein a flat heat conduction plate, in which the at least one first communication hole and the at least one second communication hole are formed, is provided between the sheath heater units, so that the coolant moves in the extended flow path.

14. The coolant heating apparatus of claim 1, wherein a first heat conduction plate of one layer has a second communication hole, which is located in a center of the outer side of the first heat conduction plate,
a second heat conduction plate of another layer has two or more second communication holes, which are respectively located on opposite ends of the outer side of the second heat conduction plate, which is farthest from the second communication hole in the center of the first heat conduction plate and is capable of ensuring a long flow path, and
a pair of the first and second heat conduction plates are alternately disposed, such that the coolant flows into the second communication hole located in the center, branches into the two or more second communication holes located in the opposite ends, joins again at the second communication hole located in the center and then flows out through the two or more second communication holes of an adjacent pair, and this process is repeated.

15. The coolant heating apparatus of claim 1, wherein opposite side ends of the heat conduction plate are bent to have a predetermined length, and then extend to form side surfaces of the coolant flow path in which the coolant moves, and the sheath heater units are stacked such that the side surfaces of the heat conduction plate form side surfaces of the housing.

16. The coolant heating apparatus of claim 15, further comprising:
a sensing member provided at a point outside the coolant flow path where two adjacent heat conduction plates meet, the sensing member being configured to sense a temperature of the two adjacent heat conduction plates; and
a controller configured to control the sheath heater based on the temperature sensed by the sensing member.

* * * * *